M. Tuells,
Spoke Shave,
N° 40,437.                    Patented Oct. 27, 1863.

Witnesses:
J. Sloan
Charles Ketchum

Inventor:
Melzer Tuells

UNITED STATES PATENT OFFICE.

MELZER TUELL, OF PENN YAN, NEW YORK.

SPOKESHAVE.

Specification forming part of Letters Patent No. 40,437, dated October 27, 1863.

*To all whom it may concern:*

Be it known that I, MELZER TUELL, of Penn Yan, in the county of Yates and State of New York, have invented a new and useful Improvement in Spokeshaves; and I do hereby declare that the following is a full, clear, and exact description of the construction and operation of the same, reference being had to the annexed drawings, making a part of this specification, in which—

Figure 1:
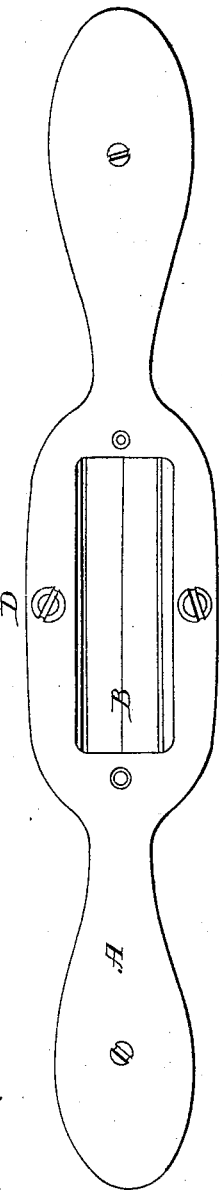
Figure 2:
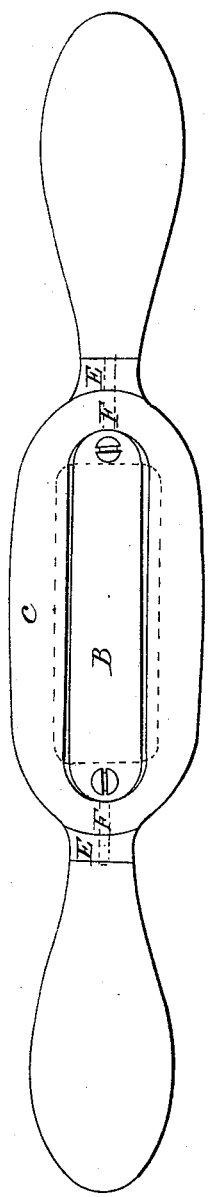
Figure 3:
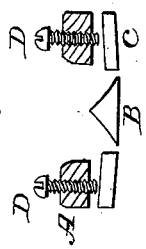

Figure 1 is a bird's-eye view. Fig. 2 is of the under side. Fig. 3 is a transverse vertical section.

The letters of reference refer to the same parts in each figure.

A is the stock. It is made with an opening or passage for the chips or shavings to pass up through while using it, and it has a handle at each end. The stock is made so that the cutter B and gage C may be fastened to it, as hereinafter described. The center of the stock, center of the cutter, and center of the gage are in the same lines, or both sides of the center are alike, so that the instrument will cut when pushed from or pulled toward the operator, or either end may be taken in the right hand and the result the same. At the under side of the stock, and in the middle and near each end of the opening, is a place fitted to receive the cutter, so that it may be held by bolts or screws that pass through both stock and cutter. The cutter must be far enough below the surface of the stock to admit the regulator above the edges of the cutter. This is done by making projections upon which the knife is fitted for.

The handles are made in line with the cutter, but may be curved up or down, as desired.

At the under side of the stock is placed the adjustable gage C. It is made the width, outside, as the stock, with an opening through it as long as and a little wider than the cutter, so that it will surround the cutter. It is held to the stock by means of pivots F and F, that pass through the projections E and E at the under side of the stock, and through holes in the ends of the gage, as represented in Fig. 2; or the pivot may be made to enter holes made in the ends of the cutter. The gage must be made so as to be easily moved upon the pivots, so that either side of the gage may be raised above the edge of the cutter to admit the edges of the cutter to take the thickness of chip required, so that the more the gage rotates the thicker will be the chip. This motion of the gage is governed by the set-screws D and D. These screws are put through the sides of the stock, as represented in Figs. 1 and 3. By these screws the thickness of the chip is regulated. When the screws are turned backward, the chip will be thicker, and when turned forward the regulator has less motion and consequently the cutter cuts a thinner chip.

I do not limit myself to any particular curve, (up or down,) but make them any curve to suit any kind of work, and when any curve of cutter is required the stock and gage must be made to correspond with it.

The cutter is made with two opposite cutting-edges, with a hole at each end for bolts or screws that hold it to the stock.

To use my invention, first find by trial the thickness of chip. If too thick or too thin, regulate by the screws D D, which is best performed by regulating one side at a time, and when both sides are regulated take one handle in each hand and place the under side of the instrument upon the work and either push it from or pull it toward you, which will cause the instrument to do the work required. This motion will cause the gage to raise to the screws D D one side at a time and allow the edge of the cutter to take hold of the work. Thus each edge of the cutter will take hold of the wood; but both edges will not cut at the same time, but the instrument will work either way, as the grain of the wood requires.

What I claim, and desire to secure by Letters Patent, is—

1. The stock A and cutter B, when constructed and arranged as and for the purpose set forth.

2. The adjustable gage C, when made and used as specified.

MELZER TUELL.

Witnesses:
I. SLOAN,
CHARLES KETCHUM.